(12) United States Patent
Hoppe

(10) Patent No.: US 6,914,352 B2
(45) Date of Patent: Jul. 5, 2005

(54) ELECTRIC MOTOR WITH IMPROVED COOLING SYSTEM

(75) Inventor: Thomas Hoppe, Schwabhausen (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/789,382

(22) Filed: Feb. 27, 2004

(65) Prior Publication Data
US 2004/0201292 A1 Oct. 14, 2004

Related U.S. Application Data

(63) Continuation of application No. PCT/EP02/09645, filed on Aug. 29, 2002.

(30) Foreign Application Priority Data

Aug. 31, 2001 (DE) .......................................... 101 42 642
Sep. 28, 2001 (DE) .......................................... 101 48 078

(51) Int. Cl.⁷ ............................................. H02K 41/00
(52) U.S. Cl. ............................. 310/12; 310/43; 310/58
(58) Field of Search ............................ 310/58, 12, 43

(56) References Cited

U.S. PATENT DOCUMENTS

| | | | | |
|---|---|---|---|---|
| 4,642,493 A | * | 2/1987 | Wallace ........................ | 310/13 |
| 4,642,494 A | * | 2/1987 | Lundin et al. ............. | 310/49 R |
| 5,128,569 A | | 7/1992 | Gladish | |
| 5,258,671 A | * | 11/1993 | Vollenwyder et al. ........ | 310/12 |
| 5,578,879 A | * | 11/1996 | Heidelberg et al. ........... | 310/54 |
| 5,703,418 A | * | 12/1997 | Assa ........................... | 310/12 |
| 5,751,077 A | * | 5/1998 | Gonzalez ..................... | 310/12 |
| 5,767,600 A | | 6/1998 | Whiteley | |
| 5,864,187 A | * | 1/1999 | Gonzalez ..................... | 310/12 |
| 6,114,781 A | * | 9/2000 | Hazelton et al. ............. | 310/12 |
| 2001/0002507 A1 | | 6/2001 | Miller et al. | |

FOREIGN PATENT DOCUMENTS

| | | |
|---|---|---|
| DE | 295 01 109 U1 | 6/1995 |
| DE | 196 04 642 A1 | 8/1997 |
| DE | 197 15 530 A1 | 10/1997 |
| DE | 199 12 136 C | 9/2000 |
| EP | 1 037 361 A | 9/2000 |
| JP | 04 183258 A | 6/1992 |

* cited by examiner

*Primary Examiner*—Joseph Waks
(74) *Attorney, Agent, or Firm*—Henry M. Feiereisen

(57) ABSTRACT

A primary part of an air-cooled electric motor, in particular a linear motor, includes a modular block with a winding body and windings housed in a sealed housing. Cooling air flows through cooling channels around the windings and through tooth gaps in the winding body. The primary part can be produced by coating the housing and a cover with a sealing composition and embedding the modular block at least partially in the sealing composition. Alternatively, the primary part can be produced by embedding the winding region of the winding body first in a first molding composition, and subsequently in a second molding composition which has a higher melting point than the first molding composition. The first molding composition is then melted and removed. The thereby produced cavities form gas inlets and outlets and gas flow paths for air cooling the interior of the primary part.

11 Claims, 3 Drawing Sheets

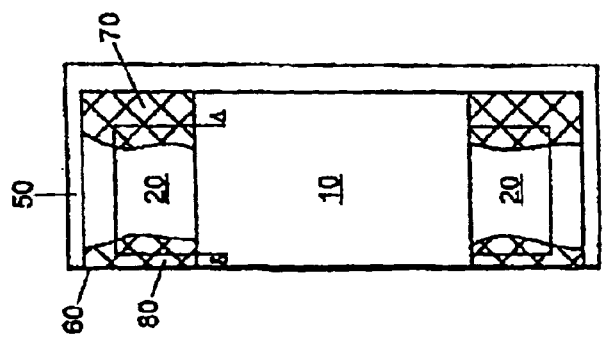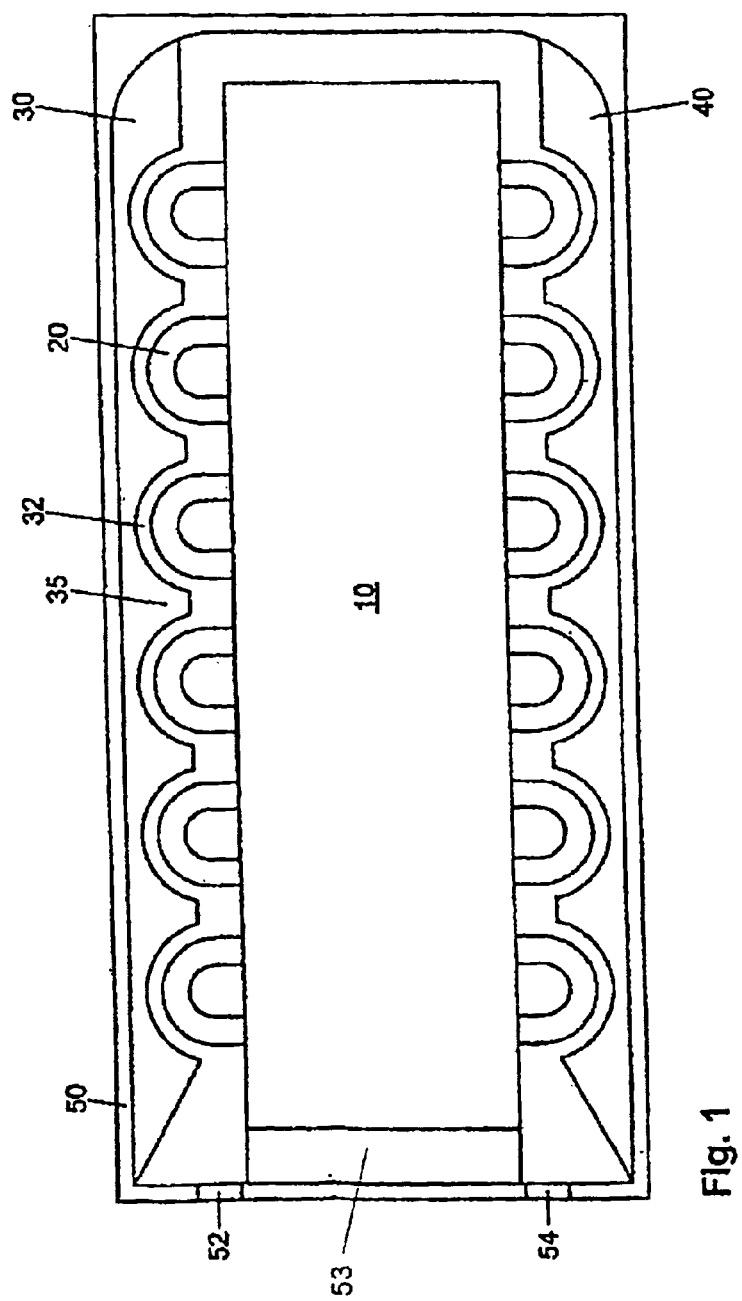

ELECTRIC MOTOR WITH IMPROVED COOLING SYSTEM

CROSS-REFERENCES TO RELATED APPLICATIONS

This application is a continuation of prior filed copending PCT International application No. PCT/EP02/09645, filed Aug. 29, 2002, which designated the United States and on which priority is claimed under 35 U.S.C. §120, the disclosure of which is hereby incorporated by reference.

This application claims the priority of German Patent Applications, Serial Nos. 101 42 642.9, filed Aug. 31, 2001, and 101 48 078.4, filed Sep. 28, 2001, pursuant to 35 U.S.C. 119(a)–(d), the disclosure of which is incorporated herein by reference.

BACKGROUND OF THE INVENTION

The present invention relates, in general, to an electric motor, for example a rotary motor or a linear motor, and more particularly to efficient cooling system of a primary part of such an electric motor. The present invention also relates to a method for producing such an electric motor.

During the operation of electric motors, in particular high-power motors, heat is generated which has to be removed to the outside. In the simplest case, this is done by thermal conduction in the primary part and by convection or radiation outside the primary part. It is also known to provide high power motors, in particular the primary parts of linear motors for machine tools, with a liquid cooling system in which, for example a serpentine cooling member is attached to the modular block or the housing, for circulation of a cooling liquid.

This type of cooling operates effectively only when considering the motor as a whole and, as a consequence of the construction, is very complex and therefore expensive. Moreover, the generated heat can only be dissipated through the winding body, i.e., the heat has first to be transported through heat conduction from the windings via the teeth to the side of the winding body that faces away from the teeth, where the cooling system is mounted.

It would therefore be desirable and advantageous to provide an improved electric motor to obviate prior art shortcomings and to have a primary part which is compact and simple in structure and which is provided with an effectively operating cooling unit. In addition, it would be desirable and advantageous to provide an improved method for manufacturing a primary part for an electric motor.

SUMMARY OF THE INVENTION

According to one aspect of the present invention, a primary part of an electric motor includes a modular block made of a toothed winding body and consecutively arranged windings applied to teeth of the toothed winding body, and a housing receiving the modular block and implemented as a closed housing to define an interior, wherein the housing includes at least one gas inlet and at least one gas outlet, and is constructed to include at least one gas flow path formed in the interior of the housing.

In general, it has been assumed that gas cooling, in particular air cooling, is less efficient than liquid cooling. The present invention is, however, based on the recognition that gas cooling, unlike liquid cooling, enables introduction of a cooling medium directly into the region that generates the heat, i.e. the region of the windings. This aspect completely or at least partially compensates the perceived drawbacks of gas cooling as compared to liquid cooling. Suitably, gas guiding elements are positioned along the gas flow path which can operate or be formed at least in the region of the windings between the teeth as turbulence elements, in order to effectively distribute or guide a gas flow in the region of the windings. The gas guiding elements may be attached hereby to the inner wall surface of the housing, or the inner wall of the housing can be configured as gas guiding elements. Suitably, the housing is constructed in a gas-tight manner or sealed in order to effectively remove the gas heated in the cooling channels.

According to one feature of the invention, the step of at least partially embedding the winding body includes the steps of placing the winding body in a first mold, filling remaining voids in the first mold with the first molding composition, and hardening the first molding composition. The step of embedding the winding body includes the steps of placing the winding body with the hardened first molding composition in a second mold, filling remaining voids of the second mold with the second molding composition, and hardening the second molding composition. The step of removing the first molding composition includes the steps of liquefying or evaporating the material of the second molding composition, and discharging the material from the second mold. Thus, as the first molding composition is removed voids are formed between the second molding composition and the modular block. These voids can be exploited to form the gas flow path with gas inlet and gas outlet, and for placement of the gas guiding elements and may. Suitably, only the winding carrying body portion of the winding body as well as the windings are embedded in the first molding composition.

According to another aspect of the invention, a method of making a primary part of an electric motor includes the steps of preparing a modular block with a winding body carrying windings, at least partially embedding the winding body in a first molding composition, embedding the winding body with the first molding composition in a second molding composition, and removing the first molding composition.

Optionally, the second housing unit can be additionally attached on the modular block, for example by welding or gluing. After the composition has completely hardened, the modular block is securely held in the housing, and the housing is sealed to the outside. Examples of hardenable compositions include conventional sealing compounds used in the electrical industry.

According to yet another aspect of the invention, a method of making a primary part of an electric motor includes the steps of coating at least an inner surface of a first housing part with a hardenable composition to a first predetermined thickness, partially placing in the first housing part a modular block, which has a winding body carrying windings, while the composition has not yet hardened, coating an inner surface of a second housing part with a hardenable composition to a second predetermined thickness, attaching the second housing part to the first housing part and the modular block, while the composition coated to the surface of the second housing part has not yet hardened, and completely hardening the composition.

In order to remove the first molding composition, the material of the first molding composition should preferably include a temperature-induced phase transition with a phase transition temperature that is higher than the processing temperature of the second molding composition. In this way, the exterior shape of the first molding composition is not changed when the second molding composition is applied.

After the second molding composition has hardened, the entire molded product can be heated up to a temperature higher than the phase transition of the material of the first molding composition. The material of the first molding composition thereby passes through a phase transition (solid/liquid; solid/gaseous), and the resulting liquid or gas can be removed.

The product can be heated from outside, for example by placing the product in a furnace or the like. Currently preferred is however a process by which electric current is applied through the windings to thereby melt the first molding composition by the generated heat. Of course, both heating methods may also be used either separately or in combination.

According to another feature of the present invention, the first molding composition can be made of a wax, whereas the second molding composition may be of a type suitable for electric applications. In general, the melting temperature of the first molding composition should be higher than the processing temperature of the second molding composition, and the melting temperature of the first molding composition should be lower than the melting temperature of the second molding composition, so that the structure of the second molding composition is not adversely affected, when the first molding composition is removed. In particular, thermosetting materials can be used for the second molding composition.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic top view of a primary part of a linear motor in accordance with the present invention, with opened housing;

FIG. 2 is a side view of a primary part during production thereof;

DETAILED DESCRIPTION OF PREFERRED EMBODIMENTS

Figure 3:
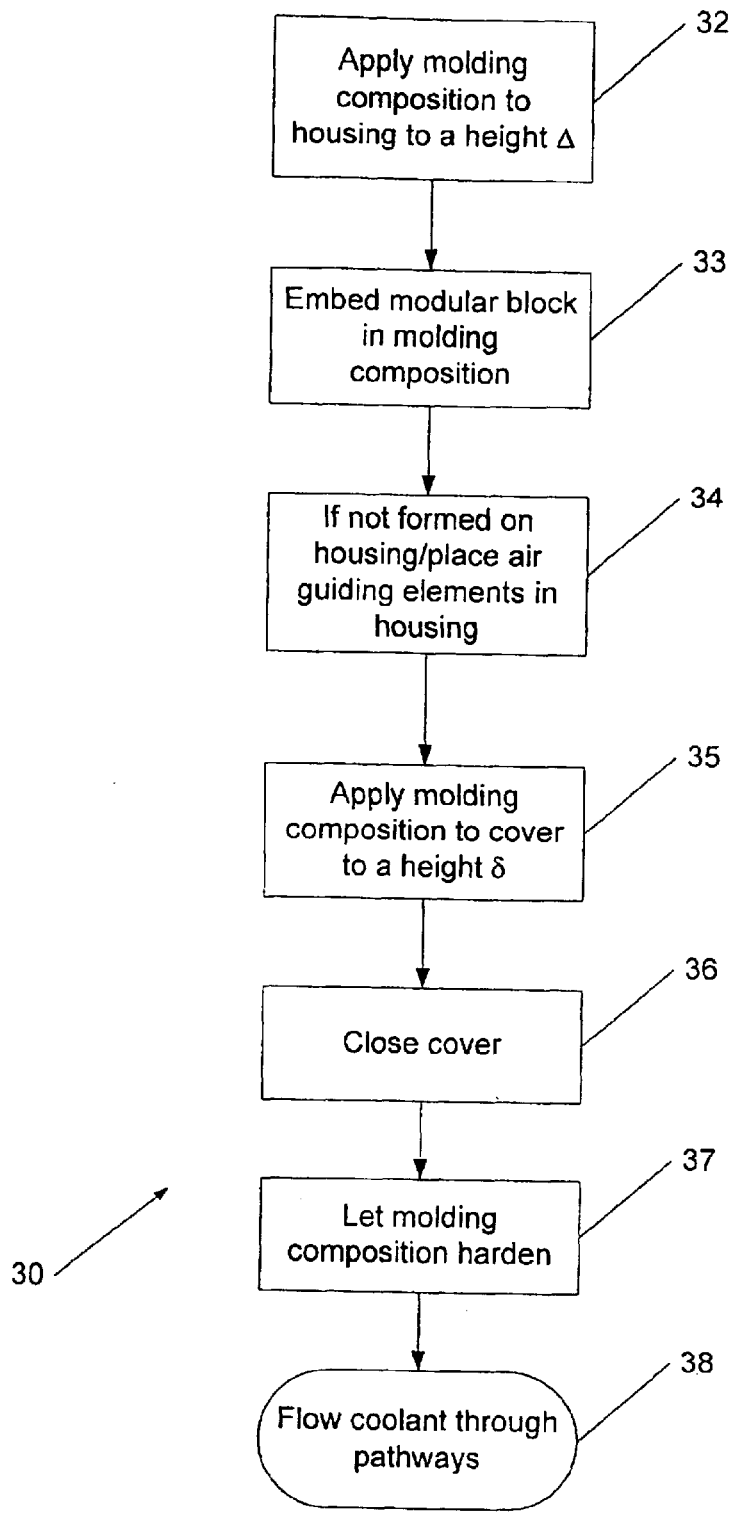
FIG. 3 shows a flow diagram of one embodiment of a process according to the present invention for making the primary part.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic top view of a primary part of a linear motor, including a block-shaped housing 50 which is open to the top, for receiving a modular block. The modular block includes a winding body 10 with teeth (not shown) for carrying windings 20. Modular blocks for the primary part of a linear motor are generally known so that a detailed description is omitted here for the sake of simplicity.

The housing 50 has longitudinal inner sidewalls for attachment of gas guiding elements 30, 40 which extend in a longitudinal direction (i.e., in the motion direction of the linear motor). The gas guiding elements 30, 40 have a curved section shaped so as to conform to the windings 20 to define gas conducting channels 32. The gas guiding elements 30, 40 are shaped as turbulence elements 35 in the region between two adjacent windings 20 and partially direct the gas flow into the region where the windings extend through the tooth gaps between the winding body 10. The turbulence elements 35 swirl the gas flow, which enters from the channels 32 into the region of the windings 20 on the winding body 10, so as to ensure of gas flow in all regions of the windings 20.

The housing 50 includes a gas inlet 52 and a gas outlet 54 configured to respectively supply and discharge a gaseous coolant, typically air. Incoming coolant flows in the longitudinal direction through the primary part on one side of the interior space of the housing 50 and returns on the other side of the interior space of the housing 50 to the air outlet 54. Accordingly, the gas flows not only around the entire modular block 10, but flows also through the modular block 10 in the region of the winding sections 20 that are located in the tooth gaps. In this way, the coolant is effectively supplied to areas that generate heat.

FIG. 2 is a side view of the primary part for providing a better understanding of the process according to the invention for making the primary part. FIG. 3 shows in form of a flow diagram a first embodiment of a process 30 according to the invention for making the primary part. In a first step 32, a layer of a, for example, commercially available molding composition 70 is introduced into the housing 50, preferably to a height Δ, which is greater than the distance of the coils from the inner surface of the housing 50. The modular block 10 is subsequently partially embedded in this molding composition 70, step 33. Optionally, in step 34, air guiding elements 30, 40 can be formed or inserted in the housing 50, as will be described below.

A cover 60 is then also coated with the molding composition before the molding composition hardens, to a height δ that corresponds to the distance between the edge of the next coil and the inner surface of the housing 50, step 35. The cover 60 so coated with the molding composition is then placed on the housing 50, step 36, and the molding composition is hardened, step 37. The primary part can now be connected to a coolant, such as air, which flow through the produced passageways, step 38. The cover 60 may, optionally, also be attached to the modular block 10 by welding, gluing or a similar process. The housing 50 can be made, for example, of stainless steel or aluminum, while the cover 60 can also be made of stainless steel or aluminum. Other suitable materials for the cover are glass-fiber-reinforced or carbon-fiber-reinforced plastics which can be made relatively thin and can be readily glued together.

The housing 50 and/or the cover 60 are coated with molding composition to a certain height to ensure the absence of any continuous air channels in longitudinal direction of the primary part in the region between a coil edge and the corresponding inner surface of the housing (both to the left and to the right of the coils in FIG. 2). The gas flow is then forced to travel past the gas guiding elements 30, 40. In addition, application of the molding composition to the cover 60 ensures that the housing 50 is gas-tight.

In addition, the winding body 10 is either flush with the end face of the housing 50, where the air inlet 52 and the air outlet 54 are located, or an additional sealing element 53 can be placed between air inlet and the air outlet to prevent a short-circuit flow.

The air guiding elements 30, 40 can be fabricated from suitably shaped sheets made of, for example, stainless steel or plastic; the air guiding elements 30, 40 can extend over the entire length of the housing 50, or they can be implemented as individual, sequentially arranged elements that are placed at suitable positions. Instead of attaching additional elements to the inner wall of the housing 50, the housing wall itself can be constructed to form the gas guiding elements 30, 40. Care should also be taken to ensure that the gas guiding elements 30, 40 extend in vertical tooth direction of the modular block 10 at least beyond the height of the coils 20.

Of course, it is also conceivable to partially embed the gas guiding elements 30, 40 in the molding composition to thereby hold them in place. This may, however, also be attained by any other suitable process such as gluing, bolting, of the like, to the housing wall.

Figure 4:
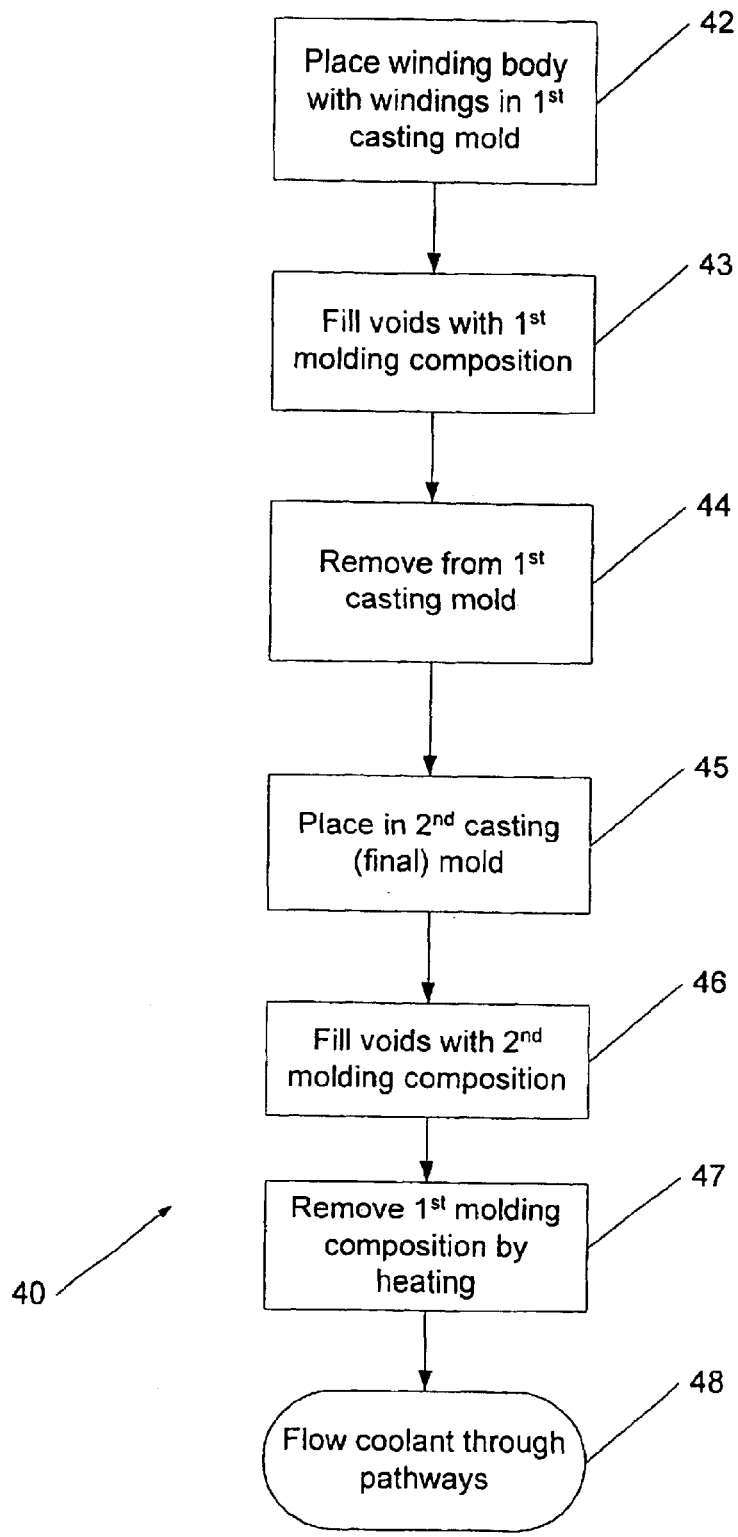
FIG. 4 shows a flow diagram of another embodiment of a manufacturing process for a primary part of a linear motor.

According to another embodiment of a manufacturing process 40 for a primary part of a linear motor depicted in FIG. 4, a winding body with windings in the form of a wound laminated core is placed in a first casting mold which is constructed to embrace the winding end portions as closely as possible or to at least conform to the shape of the windings, step 42. The mold cavity can hereby also be shaped to conform to the shape of the gas guiding elements 30, 40.

Remaining voids are then filled with a first molding composition, such as wax or a similar material, in particular in the region where the gas inlet 52 and the gas outlet 54 are to be located, step 43. The thereby produced fill regions later form the gas inlet and gas outlet for the air cooling.

The winding core filled with wax is then removed from the first casting mold, step 44, and placed in a "final mold", step 45. This mold can be a separate mold or can preferably be formed by the housing part 50. Remaining voids are filled at a temperature between approximately 80° C. and 120° C. with a second molding composition, optionally under an applied pressure or vacuum, step 46. The wax fill regions have to be open to the outside of the molding composition.

The primary part is subsequently heated, either by applying heat externally and/or by flowing an electric current through the windings. The supplied heat or the dissipated heat melts the wax which can then be removed to the outside, step 47.

Like in the first embodiment, the voids formed within the primary part by removing the wax now once more form the flow pathways for the gas coolant.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A primary part of an electric motor, comprising:
    a modular block made of a toothed winding body and consecutively arranged windings applied to teeth of the toothed winding body;
    an open housing receiving the modular block and a cover configured to close the housing to define an interior;
    a first molding composition introduced into the open housing and filling at least a first space between an inner bottom surface of the open housing and a first face of the windings facing the inner bottom surface after insertion of the modular block in the open housing, and
    a second molding composition applied to a surface of the cover with a thickness so as to fill at least a second space between the surface of the cover and a second face of the windings facing the cover after closing the open housing with the cover,
    said housing including at least one gas inlet and at least one gas outlet, and constructed to include at least one gas flow path formed between the first molding composition and then second molding composition in the interior of the housing.

2. The primary part of claim 1, and further comprising gas guiding elements arranged along the gas flow path.

3. The primary part of claim 2, wherein the gas guiding elements include turbulence elements.

4. The primary part of claim 2, wherein the gas guiding elements direct a gas flow into a region of the windings and route the gas flow into a region between the teeth of the toothed winding body.

5. The primary part of claim 2, wherein the gas guiding elements are secured to an inner wall of the housing.

6. The primary part of claim 2, wherein the housing has an inner wall constructed to form the gas guiding elements.

7. The primary part of claim 1, wherein the housing is constructed to be gas-tight.

8. An electric linear or rotary motor comprising a primary part according to claim 1.

9. The primary part of claim 1, wherein the first molding composition has a temperature-induced phase transition with a phase transition temperature which is higher than a processing temperature of the second molding composition.

10. The primary part of claim 1, wherein the first molding composition is a wax.

11. The primary part of claim 1, wherein the second molding composition is an electric potting compound.

* * * * *